US006763971B1

(12) United States Patent
Tong

(10) Patent No.: US 6,763,971 B1
(45) Date of Patent: Jul. 20, 2004

(54) CANDY DISPENSER

(76) Inventor: Kui Kwong Tong, 26 Pok Man Street, 1/F1, Kowloon (HK)

(*) Notice: Subject to any disclaimer, the term of this patent is extended or adjusted under 35 U.S.C. 154(b) by 104 days.

(21) Appl. No.: 10/246,215

(22) Filed: Sep. 18, 2002

(51) Int. Cl.[7] .......................... B65H 3/00; G07F 11/16; B65G 59/00

(52) U.S. Cl. ........................ 221/151; 221/263; 221/264

(58) Field of Search ................................ 221/263, 264, 221/151; B65G 59/00; B65H 3/00; G07F 11/16

(56) References Cited

U.S. PATENT DOCUMENTS

| | | | | |
|---|---|---|---|---|
| 1,719,826 A | | 7/1929 | Aldrich | |
| 2,004,520 A | | 6/1935 | Conti | |
| 2,019,916 A | | 11/1935 | Leasley | |
| 2,419,990 A | * | 5/1947 | Dishmaker | 446/173 |
| 3,270,915 A | | 9/1966 | Auer | |
| 4,146,151 A | | 3/1979 | Davis | |
| 4,216,878 A | | 8/1980 | Naud | |
| 4,381,845 A | | 5/1983 | Feis | |
| 4,405,060 A | | 9/1983 | Hsei | |
| 4,848,593 A | | 7/1989 | Jeandaud | |
| 5,553,739 A | | 9/1996 | Plum et al. | |
| 5,657,901 A | | 8/1997 | Farside | |
| 6,131,765 A | | 10/2000 | Barry et al. | |
| 6,286,564 B1 | * | 9/2001 | Wallace | 141/18 |

FOREIGN PATENT DOCUMENTS

| | | | | |
|---|---|---|---|---|
| EP | 0 319 492 | * | 4/1987 | G07D/1/04 |

* cited by examiner

*Primary Examiner*—Donald P. Walsh
*Assistant Examiner*—Kenneth W Bower
(74) *Attorney, Agent, or Firm*—Schweitzer Cornman Gross & Bondell LLP

(57) ABSTRACT

A candy dispenser transfers candy packaged in a loading container through a valve into a dispensation magazine when the dispenser is in a first orientation. The candies can subsequently be dispensed from the magazine when the dispenser is inverted. A manually-operated plunger mechanism then removes the candies from the magazine. The dispenser provides a sanitary container for the candies and also provides operating interest to the user. Additional candies can be loaded into the dispensation magazine by replacing the loading container.

9 Claims, 4 Drawing Sheets

FIG. 1
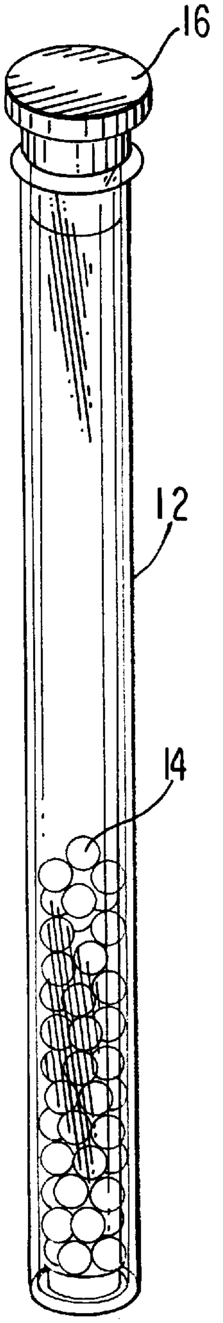
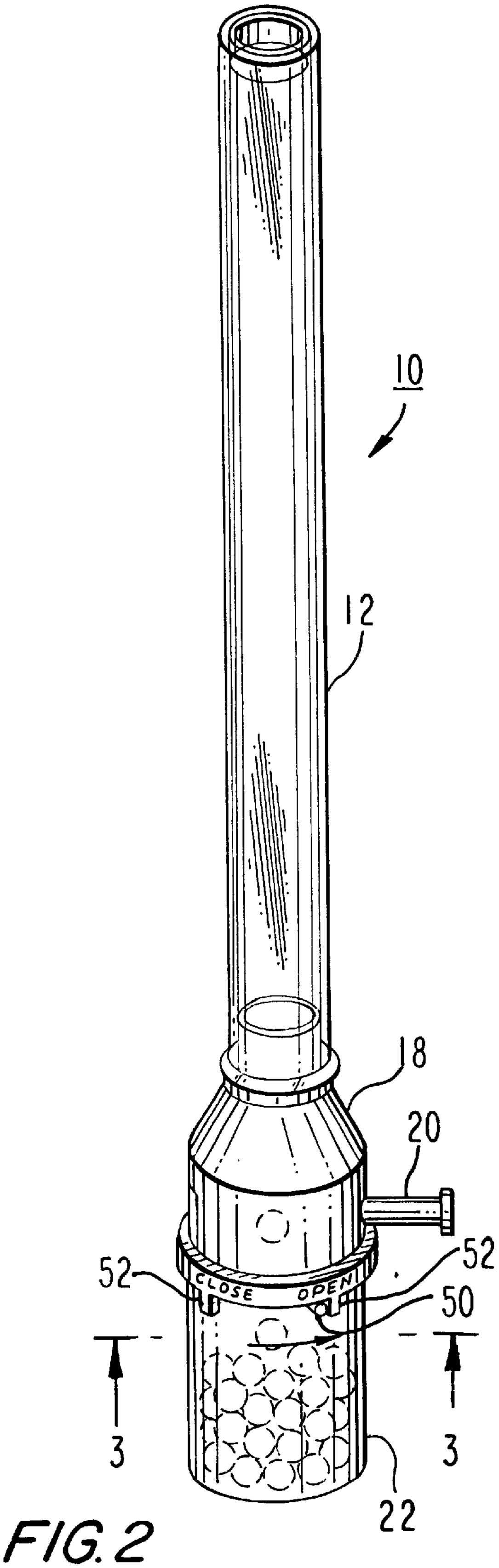
FIG. 2

FIG. 6
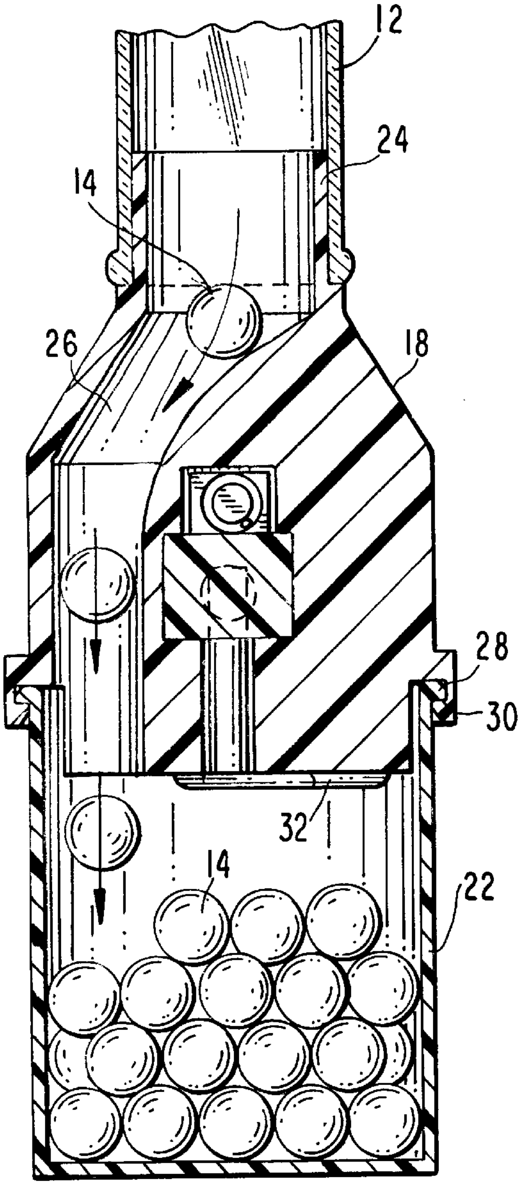
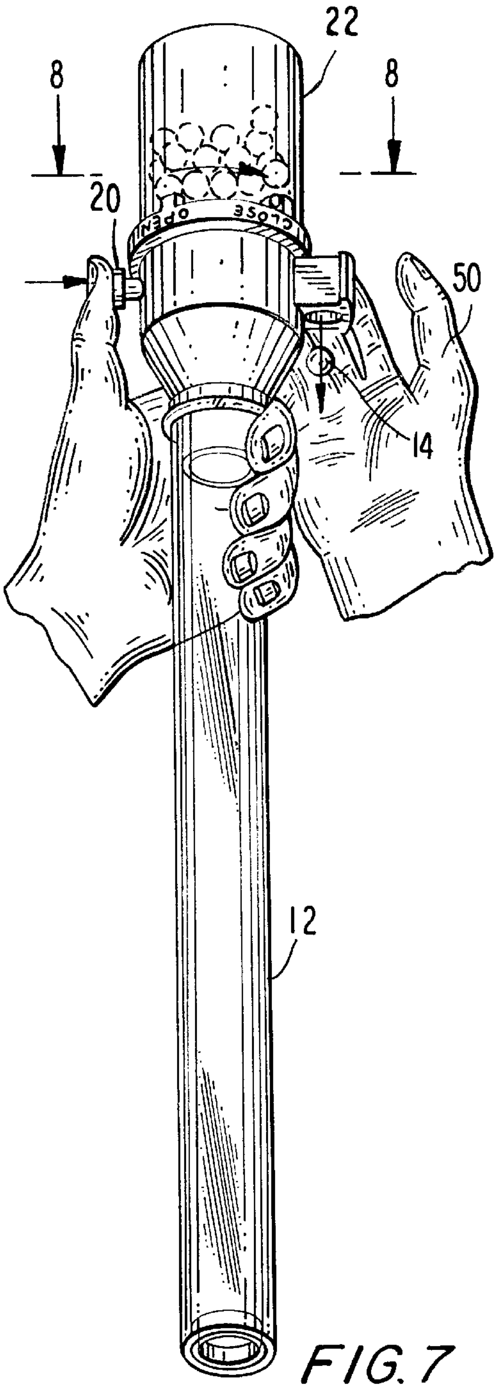
FIG. 7

FIG. 8
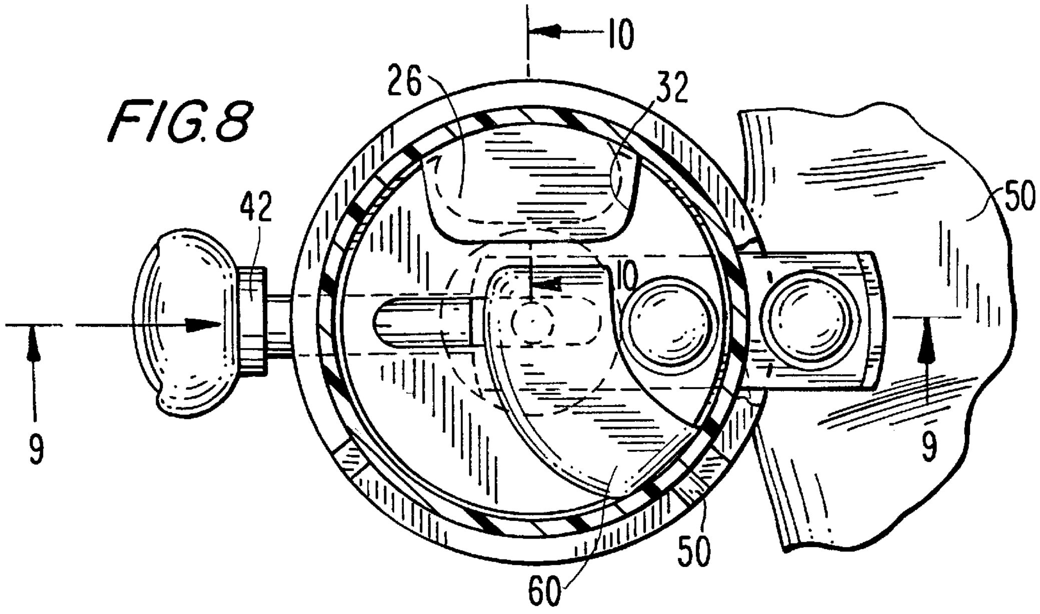
FIG. 9
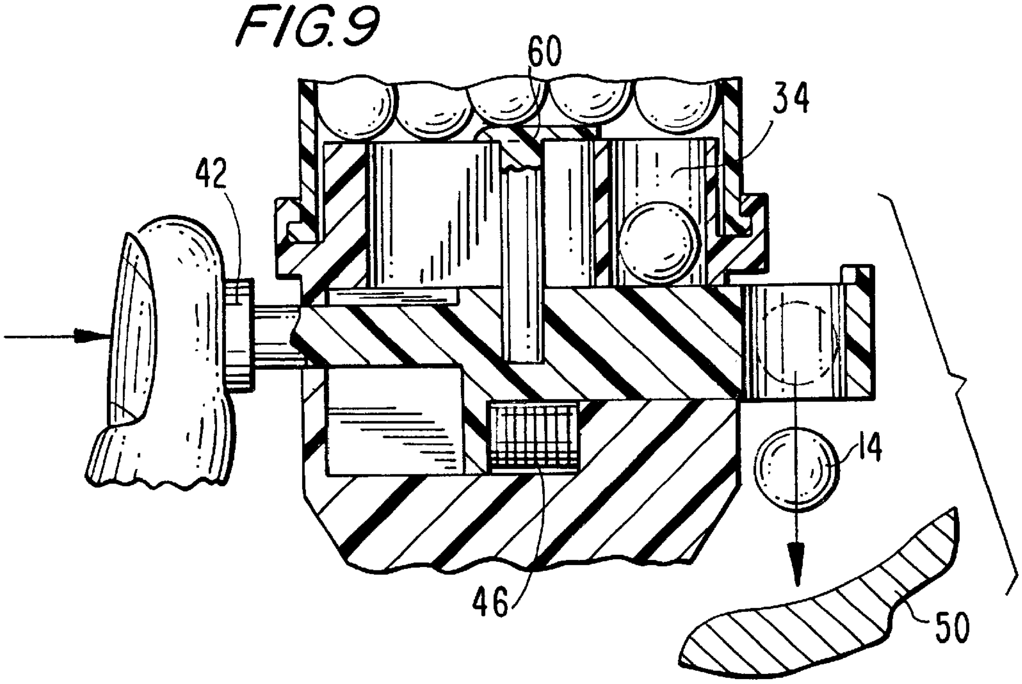
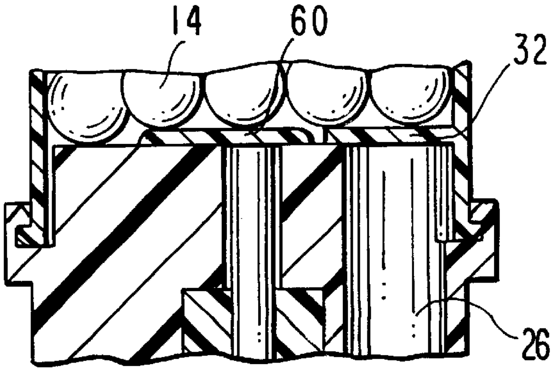
FIG. 10

CANDY DISPENSER

The present invention relates to a new and improved manual dispenser for small items, such as candy.

BACKGROUND OF THE INVENTION

Small items, and in particular candy, are often packaged in clear, tubular containers, allowing the contents to be seen. Dispensation of the contents is performed either by emptying the contents of the tube into an open container, such as a dish or bowl from which the contents are taken as desired, or by pouring the contents directly into the hand. The latter method of dispensation makes it difficult to dispense a controlled number of the candies, as they tend to fall and pour as a mass rather than in a controlled manner. Return of the over-dispensed quantity to the container is often done, but this raises sanitary issues, particularly when the candies are being dispensed by a child. Children in particular often share such candies, and the re-dispensing of an initially overly generous amount of candies can result in the candies being subject to contact with numerous hands and their subsequent returns to the container.

It is accordingly a purpose of the present invention to provide a dispenser for small objects, such as candies, which allows dispensation in a controlled manner.

A further purpose of the present invention is to provide such a dispenser which may be utilized with conventional tubular containers for the candies, and which allows reloading of the dispenser.

Yet a further purpose of the present invention is to provide such a dispenser for candies and the like which is economical and convenient to operate, and which allows the candies to be dispensed in a sanitary manner.

A still further purpose of the present invention is to provide such a dispenser which can provide a level of interest in operation to the user, particularly when the user is a child.

BRIEF DESCRIPTION OF THE INVENTION

In accordance with the foregoing and other objects and purposes, a dispenser constructed in accordance with the present invention comprises a housing having a first end to which a first, loading container bearing candies or other small objects is affixed and a second end having a dispensation magazine or reservoir. A passageway extends through the housing, and connects the first container to the dispensation magazine, allowing the candies in the chamber to be loaded into the magazine. With the candies loaded into the magazine, a manual dispensing mechanism associated with the magazine allows the candies to be dispensed, one at a time, from the magazine. The dispensing mechanism may be located in the housing, allowing the candies to be dispensed through a sidewall of the housing. In a preferred embodiment a manually-operated valve is associated with the passageway between the first container and the magazine, allowing the candies to pass under the influence of gravity from the first container to the magazine when the apparatus is in a first orientation but not back to the first container when the apparatus is inverted; the dispenser mechanism operates when the apparatus is in the inverted position.

BRIEF DESCRIPTION OF THE DRAWINGS

A fuller understanding of the present invention will be accomplished upon consideration of the following detailed description of a preferred, but nonetheless illustrative embodiment of the invention, when reviewed in association with the annexed drawings, wherein:

FIG. 1 is a perspective view of a cylindrical candy container with which the present apparatus may be used;

FIG. 2 is a perspective view of the invention in a first position, showing candies loaded in the dispensation magazine;

FIG. 6 is a sectional view taken along line 6—6 of FIG. 4 depicting the passage of candies into the dispensing magazine from the loading container;

FIG. 7 is a perspective view of the invention in a second, dispensing position;

FIG. 8 is a sectional view taken along line 8—8 of FIG. 7 detailing the dispensation of a candy;

FIG. 9 is a sectional view taken along line 9—9 of FIG. 8; and

FIG. 10 is a sectional view taken along line 10—10 of FIG. 8.

DETAILED DESCRIPTION OF THE INVENTION

Figure 3:
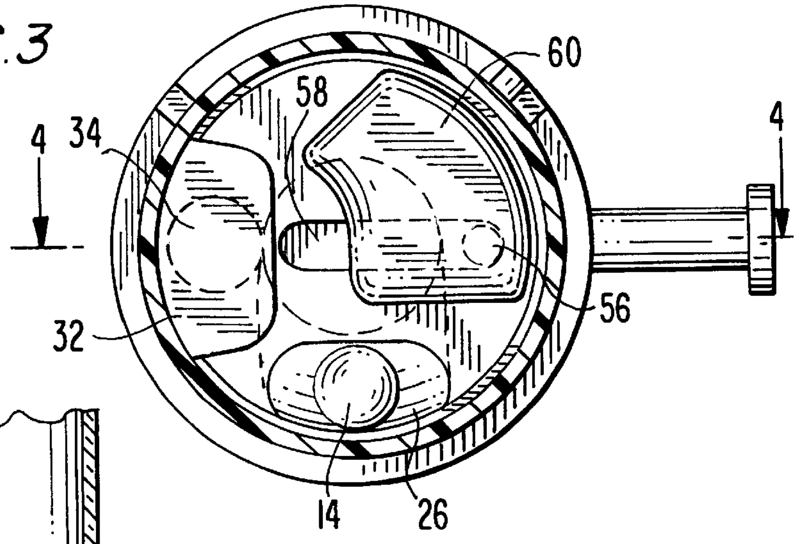
FIG. 3 is a section view taken along line 3—3 of FIG. 2.

Referring initially to FIGS. 1 and 2, the present invention allows the incorporation of known cylindrical or tubular candy holders/packaging 12 as part of the dispensing apparatus 10 of the invention. The cylindrical packaging 12 bears contents, such as gumballs 14, the open end of the cylindrical packaging being sealed by a removable stopper 16. The candy dispenser 10 of the present invention includes a main body or housing 18, to which the cylindrical packaging 12 is affixed at a first end and which forms a first, loading container for the apparatus, while a dispensation magazine 22 is affixed to a second end of the housing. The loading container and dispensation magazine are connected by a passageway in the housing. A dispensing mechanism is associated with the dispensation magazine to allow the candies loaded into the magazine to be individually dispensed. The dispensing mechanism may be located in the housing, and includes manually-operable plunger unit 20 extending from the sidewall of the housing. The candies are ejected by the plunger through the opposite portion of the housing sidewall.

It is preferred that the dispenser apparatus be gravity operated. Thus, the candies originally in loading container 12 pass into dispensing magazine 22 when the apparatus is in a first orientation shown in FIG. 2, and are dispensed when the apparatus is inverted to the second orientation shown in FIG. 7, in which the candies in the dispensing magazine are gravity-loaded into the dispensing mechanism in the housing. To prevent the return of the candies into the loading container 12 when the apparatus is in the second orientation, a valve is provided in association with the passageway between the dispenser container 12 and the magazine 22. With the valve in the open position, the candies originally located in the cylindrical container 12 can pass into the dispensing magazine 22 when the apparatus is in the first orientation depicted in FIG. 2. The valve is then moved to the closed position, sealing the dispensation magazine 22 from the cylindrical container 12, and the apparatus 10 is inverted to the second orientation shown in FIG. 7. In that orientation, manual activation of the plunger 20 allows individual dispensation of the candies.

With further reference to FIG. 6, housing 18, which may be formed of an appropriate plastic, includes a cylindrical fitting 24 at its first end providing a friction-fit mounting for the open end of the loading container 12. The fitting serves as an entranceway for the internal main passageway 26 through the housing which leads to the dispensation magazine 22, which may be in the form of a container or cup. The dispensation magazine may be formed with a peripheral shoulder 28 at its upper edge, which shoulder engages a mating internal groove at the lower end of the housing to both maintain the magazine in connection with the housing and to permit relative rotation therebetween, as will be discussed. The magazine may also be of an appropriate plastic. While it is preferred that the loading container 12 be sealed at its distal end, whereby a new container is mounted to the apparatus to refill the dispensing magazine, it is recognized that the container 12 may be provided with another sealable aperture to allow candies to be reloaded into the container. The loading container is preferably transparent, so that the user can observe the "disappearance" of the candies as they fall into the dispensing magazine. While FIG. 2 shows the candies after they have fallen from the loading container 12 into the dispensation magazine 22, it is to be recognized that the apparatus is preferably oriented in the second, inverted position shown in FIG. 8 when a new loading container is to be attached to the housing 18 to prevent spillage. The apparatus is then re-inverted to the position of FIG. 2 to allow the candies to drop into the dispensation magazine.

To prevent return of the candies to the loading container when the apparatus is inverted to the second orientation, a valve is provided in association with the passageway 26. The valve may be in the form of an inwardly-directed flange or cover 32, best seen in FIGS. 3 and 8, extending from the dispensation magazine sidewall at the upper end of the magazine. Relative rotation of the magazine with respect to the housing allows the cover to alternatively block or expose the lower end of the main passageway 26, thus controlling passage of the candies between the loading container and the magazine. FIGS. 3 and 6 depict the cover 32 displaced from the main passageway 26, exposing the passageway and allowing the candies to pass from the loading container to the magazine, while FIG. 8 depicts the cover closing the main passageway, preventing the return of the candies into the loading container with the apparatus inverted. Alternative constructions, such as a one-way flap valve, may also be used.

To allow controlled dispensation of the candies from the dispensation magazine 22, a manually-operated dispensing mechanism is employed. The mechanism may be mounted to the magazine, or preferably to the housing, whereby it becomes operative when the apparatus is inverted to the second orientation as shown in FIG. 7.

Figure 4:
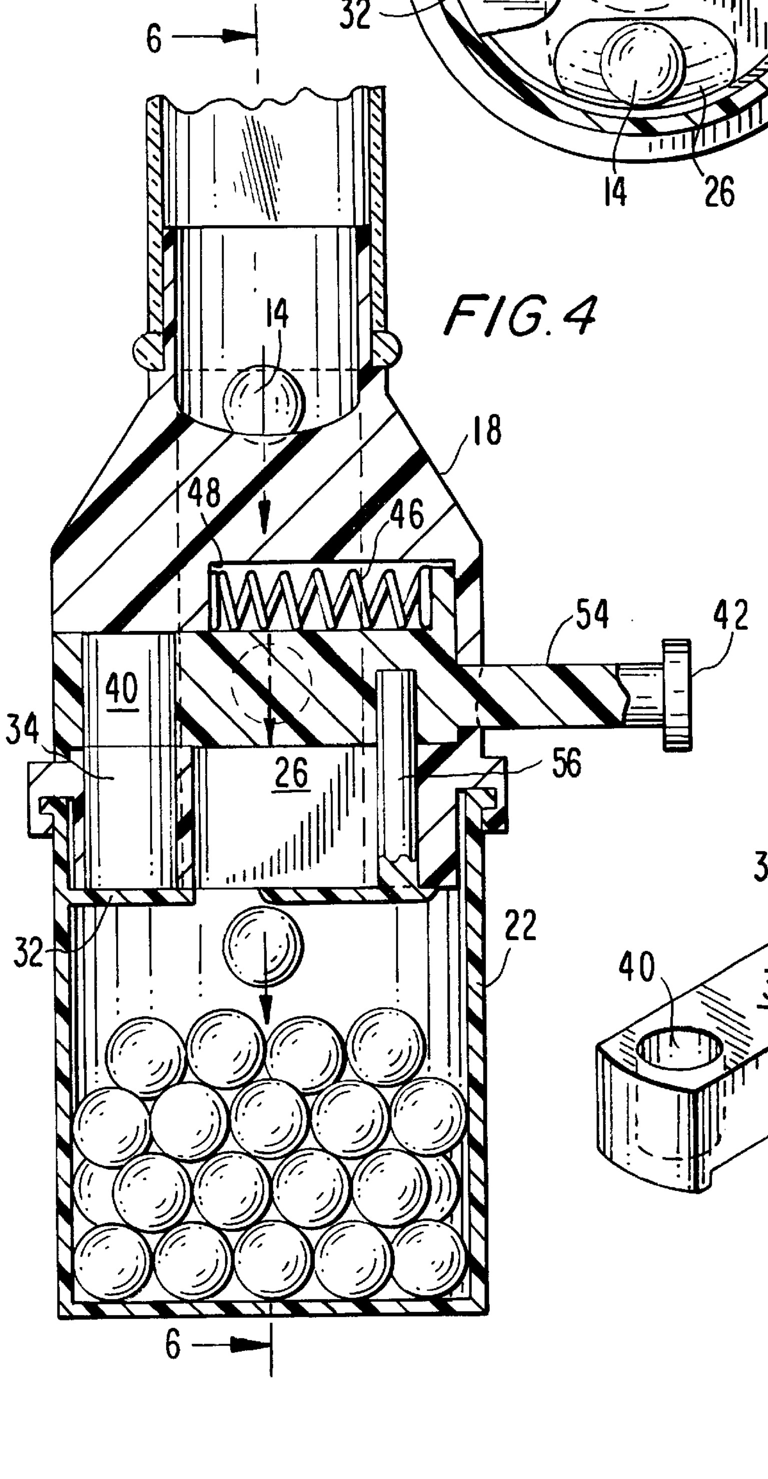
FIG. 4 is a sectional view of the lower portion of the dispenser apparatus, taken along line 4—4 of FIG. 3.
Figure 5:
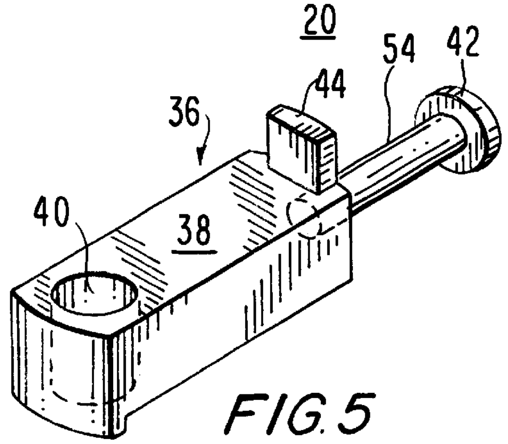
FIG. 5 is a perspective view of a plunger mechanism utilized in connection with the invention.

As further seen in the figures, such as in FIG. 4, the dispensing mechanism may include a second passageway 34 in the housing 18 which connects with the dispensation magazine 22. The lower end of the passageway is shown closed by the cover 32 when the main passageway is exposed, as shown in FIGS. 3 and 4, but such closing is not required. The passageway 34 connects the dispensation magazine 22 to a transverse receiving bore in the housing for plunger 36, best seen in FIG. 5. As shown therein, plunger body 38 is provided with throughbore 40 dimensioned to accept a candy unit 14. The plunger handle 54 is mounted to an end of the body, and may be provided with a distal finger pad 42. Flange 44 extends upwardly from the upper surface of the body. The plunger is located in the transverse receiving bore in the housing 18 with spring 46, mounted between the plunger flange 44 and opposed internal housing wall 48, biasing the plunger into a first position as shown in FIG. 4, in which the plunger throughbore 40 is aligned with the passageway 34. Guide pin 56 affixed to the plunger body reciprocates in slot 58 formed in housing 18 and is retained by plate 60.

As previously indicated, the dispensation magazine 22 may be rotated with respect to the housing 18, whereby the flange/cover 32 is rotated between alternative positions in which it seals or exposes the lower end of main passageway 26. These orientations correspond to the designations "close" and "open" as shown in FIG. 2. As depicted, when the dispensation magazine is rotated to the "open" position, (seen in FIG. 3), the flange 32 exposes the lower end of passageway 26 and closes the second passageway 34, allowing the candies in cylinder 12 to fall through the main passageway 26 into the dispensation magazine 22 when the apparatus is oriented as shown in FIGS. 2, 4 and 6. On the other hand, when the dispensation magazine 22 is rotated to the "close" position, the flange substantially blocks the main passageway 26, preventing the candies from returning from the dispensation magazine to the cylindrical package when the apparatus is inverted to the position of FIG. 7, while at the same time exposing the end of the second passageway 34 to allow the candies to enter therein for dispensation. As indicated, the closing of the second passageway is not necessary for the operation of the apparatus.

As depicted in FIGS. 7–9, with the dispenser apparatus positioned as shown in FIG. 7 and the dispensation magazine in a "close" position, the second passageway 34 is exposed, allowing a candy 14 to fall thereinto from the magazine 22 under the influence of gravity and from there to pass into the aligned, accepting throughbore 40 in the plunger assembly 36. With finger pressure applied to the plunger pad 42 to overcome the bias of spring 46, the plunger is shifted transversely in the accepting bore, whereby the throughbore 40 is placed exterior to the housing as depicted in FIG. 9, allowing the candy 14 received thereby to fall into the hand 50 of the user. A second candy item 14 can remain in the passageway 34, and drops into the throughbore 40 when the plunger returns to its initial position. Subsequent action on the finger pad dispenses the second candy. The action may be repeated as long as candies remain in the dispenser magazine, the candies being dispensed on an individual basis as desired.

Rotation of the dispenser magazine with respect to the housing may be controlled by the use of a pin 50 extending outwardly from the magazine which alternatively engages one of a pair of stops 52 formed into the housing wall and which defines the desired covering positions for the flange/cover 32, as shown in FIG. 2. After dispensation, if it is desired to refill the magazine 22, a replacement cylindrical package 12 is affixed to the apparatus when in the orientation of FIG. 7, to prevent spillage of the candies. The apparatus is then re-inverted to the position of FIG. 2, and the dispensation magazine 22 rotated to the "open" position, clearing the main passageway and allowing the candies in the cylindrical package to fall into the dispensing magazine. The magazine is then rotated to the "close" position, preventing the candies from re-entering the cylindrical package 12, and the dispenser is returned to the position of FIG. 7. So oriented, the candy in the magazine 22 may be again dispensed. Alternatively, if it is desired to clear the candies from the dispenser and return them to the cylindrical package, such as when it is desired to substitute a different candy, the dispensation magazine is merely rotated back to the open position while in the orientation of FIG. 7, the candies falling under the influence of gravity from the magazine into the cylindrical package. The cylindrical package can then be removed from the apparatus and replaced with a different one.

I claim:

1. A dispenser apparatus for small objects comprising a housing having first and second ends; a loading container for the small objects mounted to the first end and a dispensation magazine mounted to the second end; a first passageway within the housing connecting the loading container and the dispensation magazine; a valve associated with the first passageway; and a manually-operated dispensing mechanism associated with the dispensation magazine.

2. The apparatus of claim 1, wherein the dispensing mechanism is located in the housing.

3. The apparatus of claim 2, wherein the dispensing mechanism includes a spring-biased plunger.

4. The apparatus of claim 3, wherein the plunger is mounted for transverse displacement in the housing.

5. The apparatus of claim 4, wherein the plunger includes a receiving bore for a small object, the small object received therein being dispensed through a sidewall of the housing.

6. The apparatus of claim 1, wherein the loading container is interchangeable.

7. The apparatus of claim 1, wherein the dispensation magazine is rotatably mounted to the housing, the valve being mounted to the dispensation magazine.

8. The apparatus of claim 6, wherein the valve comprises a rotating cover for an end of the first passageway.

9. A method for the dispensation of small objects from a dispenser, comprising the steps of:

loading the small objects into a loading container;

mounting the loading container onto a first end of a housing and orienting the container such that the loading container is above a dispensation magazine mounted to a second end of the housing:

opening a valve in the housing to allow the small objects to pass from the loading container through the housing into the dispensation magazine and then closing the valve; and inverting the housing such that the dispensation magazine is above the housing and operating a dispensing mechanism to eject one of the small objects from the dispensation magazine.

* * * * *